June 19, 1962     S. ANDRASSY     3,039,453

HEATER

Filed July 1, 1959

INVENTOR.
STELLA ANDRASSY
BY Philip Mintz
ATTORNEY

United States Patent Office 3,039,453
Patented June 19, 1962

3,039,453
HEATER
Stella Andrassy, Princeton, N.J.
(Ridge Road, Kingston, N.J.)
Filed July 1, 1959, Ser. No. 824,280
2 Claims. (Cl. 126—271)

This invention relates to a new and improved heat exchanger unit. More particularly, this invention relates to a solar water heater unit which can be economically fabricated, is relatively light in weight, which is corrosion resistant, and which will not be damaged in the event of freezing.

Many devices have been developed for utilizing solar energy. One broad class of these devices utilizes solar energy in the form of heat collected at moderate temperatures. This is frequently done by using solar energy to heat water to an elevated temperature in the solar heat collector of such devices. The heated water from such a solar heat collector may be utilized for heating houses, preparing hot water for domestic uses, heating swimming pools, heating other liquids, etc.

The currently used solar water heaters are usually made of metal, frequently in the form of metallic tubing soldered in a serpentine fashion to the face or back of a blackened metal plate. Such a structure is expensive due to high fabrication costs and heavy weight of metal used. In the winter or when there is danger of nocturnal freezing, such a solar water heater must be drained or else antifreeze must be used therein. If antifreeze is used, it is necessary to have an additional heat exchanger for heating water to be used for domestic purposes. This clearly reduces the operating efficiency of such apparatus, and further adds to the cost.

One of the objects of the present invention is to overcome the disadvantages of conventional heat exchangers.

Another object of the present invention is to provide a solar fluid heater unit which is light in weight, is easily and economically fabricated, is free from corrosion, and in which the advent of freezing produces no damage.

Still another object of the present invention is to provide a heat exchanger unit which is light in weight, easily and economically fabricated, is free from corrosion, and which may readily be modified for different heat exchange applications.

With the above objects in view, the present invention mainly consists of a heat exchanger having a flexible plastic conduit secured to a crimped heat conductive plate.

The novel features which are considered as characteristic of the invention are set forth with particularity in the appended claims. The invention itself, however, both as to its construction and its method of operation together with additional objects and advantages thereof, will be best understood from the following description of specific embodiments when read with the accompanying drawings, in which;

Figure 1:
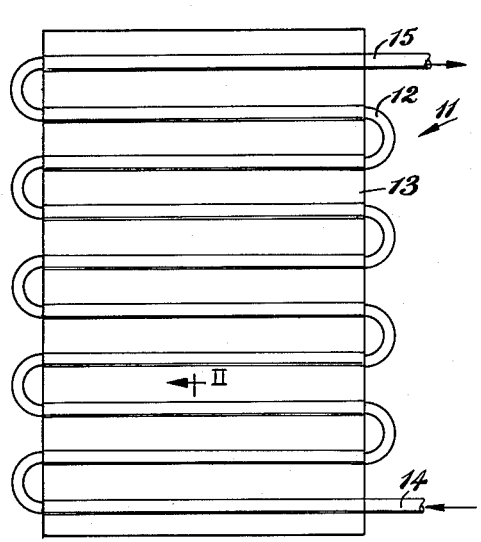
FIGURE 1 is a plan view of a solar fluid heater unit incorporating the principles of this invention.
Figure 2:
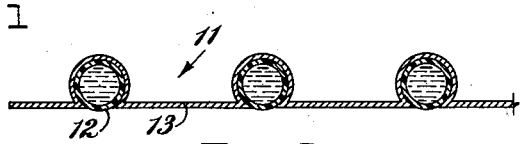
FIGURE 2 is a vertical cross section taken along line II—II of FIGURE 1.

Referring to the drawings, and more particularly to FIGURES 1 and 2, there is shown a solar fluid heater unit 11 constructed according to the principles of this invention.

The solar fluid heater 11 is made of a flexible plastic conduit 12 secured to a crimped metallic plate 13. Conduit 12 is provided with a fluid inlet 14 for fluid to be heated and with a fluid outlet 15 for exhausting the heated fluid.

To construct such a fluid heater 11, metallic plate 13 is first crimped to a configuration such as shown in FIGURE 2. Flexible tube 12 is then snapped into the grooves in crimped metallic plate 13 with a suitable tool.

The configuration of the groove in metallic plate 13 is of substantially circular cross section and is greater than 180° in circumference. This enables the flexible tube 12 to be retained in the grooves without the use of additional fastening means if desired.

Crimped metallic plate 13 may be of aluminum or copper or other highly heat conducting material, and is preferably coated with a radiant energy absorptive coating, such as black paint, on one side.

Flexible plastic conduit may be of such materials as "boilable" polyethylene tubing which is black pigmented to resist sunshine, or polytetrafluoroethylene, or any other plastic which is flexible, and which will resist the action of sunshine and contact with the liquid being heated. It is to be noted that the plastic conduit must be sufficiently flexible as to allow for expansion without breakage when water within the conduit freezes.

To use such a solar fluid heater unit for heating water, heater unit 11 is placed in a position where sunshine may fall upon it. That side of crimped metallic plate 13 which is coated with a radiant energy absorptive coating is placed upward. The incident sunlight, impinging upon the absorptive coating is converted to heat, raising the temperature of metallic plate 13. The heat is conducted through metallic plate 13 and is transferred to the fluid flowing through conduit 12, thereby heating the fluid.

Where the requirements are for a large volume of water to be heated only slightly above the ambient air temperature such as for swimming pool heaters, fluid heater 11 may be used by itself as illustrated in FIGURES 1 and 2. However, where the requirements are for a smaller volume of substantially hotter water; i.e., substantially hotter than ambient air temperature such as for preparing hot water for domestic uses; the solar fluid heater unit may be placed within an incasement as illustrated in FIGURE 3.

Figure 3:
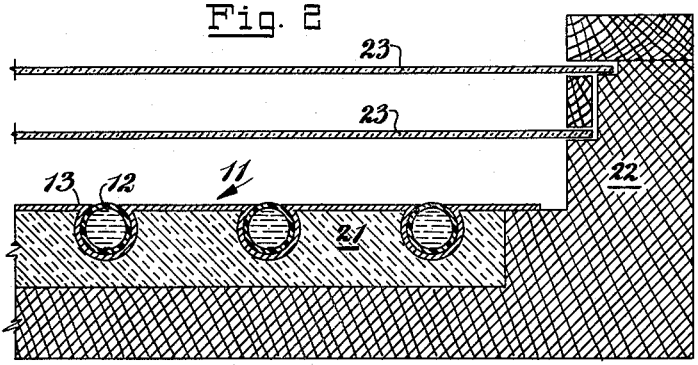
FIGURE 3 is a vertical cross section showing a solar fluid heater unit incorporating the principles of this invention incorporated within a housing for producing higher temperatures.

As illustrated in FIGURE 3, solar fluid heater unit 11 is provided with an insulated backing 21, which may be foam plastic or glass wool, etc. Solar fluid heater unit 11 with insulated backing 21 may be placed within a wood incasement 22 which incasement also supports one or more glass or transparent plastic films 23 above solar fluid heater unit 11. The inclosure of solar heater unit 11 by insulation below and transparent glass or plastic films 23 above, greatly increase the temperature which may be achieved in solar fluid heater unit 11.

It is thus seen that there has been provided a solar water heater unit which is easily and economically fabricated, which is light in weight, which is not subject to corrosion, and which is not subject to damage upon freezing.

Of course, unit 11 may be used as a heat exchanger by passing a fluid to be either heated or cooled through flexible conduit 12. Such fluid will be either heated or cooled by the action of the surroundings external to unit 11. Alternatively a fluid may be passed through conduit 12 for the purpose of either heating or cooling the area surrounding unit 11. For such applications, the use of flexible plastic tube 12 provides a corrosion-free passageway for the fluid contained therein. Heat conductive plate 13 provides an extended heat transfer surface for increasing the rate of heat transfer between the fluid within tube 12 and the surroundings.

Figure 4:
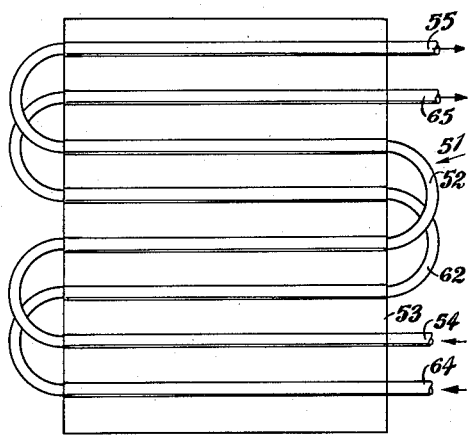
FIGURE 4 is a plan view of another heat exchanger unit incorporating the principles of this invention.

As illustrated in FIGURE 4 two flexible plastic conduits 52 and 62 may be placed in alternate grooves in crimped metallic plate 53. This provides two substantially parallel fluid passageways, one being in tube 52 from inlet 54 to outlet 55, the other being in tube 62 from inlet 64 to outlet 65. Of course the positions of inlet and outlet may be reversed depending upon whether it is desired to have parallel flow or countercurrent flow in tube 52 and tube 62. If a relatively hot fluid is passed through conduit 52, it may be used to heat a relatively cool fluid passing through conduit 62. The heat exchange between conduit 52 and conduit 62 is facilitated by crimped heat conductive metallic plate 53.

Should it be desired to exchange heat among more than two fluids, more than two conduits are placed in parallel grooves in a crimped heat conductive metallic sheet in a manner analogous to that illustrated in FIGURE 4.

Since the flexible conduits 12, 52, and 62 are retained in contact with heat conductive plates 13 and 53 by means of the grooves in these plates, the heat exchanger may readily be modified for other applications. This may easily be accomplished by removing the flexible tubes from the heat conductive plates and replacing them in other configurations. For example, the heat exchanger of FIGURE 1 can readily be converted into the heat exchanger of FIGURE 4.

While the invention has been illustrated and described as embodied in certain solar fluid heater unit constructions, it is not intended to be limited to the details shown, since various modifications and changes may be made without departing in any way from the spirit of the present invention as defined in the claims.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should be and are intended to be comprehended within the meaning and range of equivalents of the following claims.

What is claimed as new and desired to be secured by Letters Patent is:

1. A solar fluid heater which comprises a heat conductive plate adapted to be exposed to solar energy and having a plurality of crimped portions, an insulating backing, said heat conductive plate being mounted on said insulating backing, said crimped portions being received in said insulating backing and forming a plurality of parallel, tubular grooves, the side walls of which are curved through an angle of more than 180 degrees, leaving an opening into each of said grooves extending the length of said grooves; a flexible plastic tube having an outer diameter slightly larger than the diameter of the tubular grooves extending through said grooves and frictionally gripped therein by the arcuate side walls of said tubular grooves; means for introducing fluid to be heated in one end of said plastic tube; and means for removing the fluid from another end of said plastic tube whereby the solar energy absorbed by said heat conductive plate is transferred to the fluid passing through said plastic tube.

2. A solar fluid heater which comprises a closed casing having a transparent cover portion adapted to be exposed to sunlight, said casing having an insulated backing therein; a heat conductive plate having a plurality of crimped portions positioned within said casing between said transparent cover portion and said insulated backing and mounted on said backing; said crimped portions forming a plurality of parallel, tubular grooves, the side walls of which are curved through an angle of more than 180 degrees, leaving an opening into each of said grooves extending the length of said grooves, said crimped portions being received in arcuate grooves in said insulated backing; a flexible plastic tube having an outer diameter slightly larger than the diameter of the tubular grooves extending through said grooves and frictionally gripped therein by the arcuate side walls of said tubular grooves; means for introducing fluid to be heated in one end of said plastic tube; and means for removing the fluid from another end of said plastic tube whereby the solar energy absorbed by said heat conductive plate is transferred to the fluid passing through said plastic tube.

References Cited in the file of this patent

UNITED STATES PATENTS

| | | |
|---|---|---|
| 2,250,325 | Barnes | July 22, 1941 |
| 2,311,579 | Scott | Feb. 16, 1943 |
| 2,553,302 | Cornwall | May 15, 1951 |
| 2,608,968 | Moseley | Sept. 2, 1952 |
| 2,646,971 | Raskin | July 28, 1953 |
| 2,753,435 | Jepson | July 3, 1956 |
| 2,869,337 | Collins | Jan. 20, 1959 |
| 2,872,915 | Bowen | Feb. 10, 1959 |